United States Patent [19]

Szymkowiak, Zbigniew

[11] Patent Number: 4,674,589

[45] Date of Patent: Jun. 23, 1987

[54] VEHICLE DRIVE AND SUSPENSION SYSTEM

[75] Inventor: Szymkowiak, Zbigniew, Kitchener, Canada

[73] Assignee: Ontario Drive and Gear Limited, New Hamburg, Canada

[21] Appl. No.: 789,406

[22] Filed: Oct. 21, 1985

[30] Foreign Application Priority Data

Oct. 22, 1984 [CA] Canada .................................. 466036

[51] Int. Cl.⁴ ...................... B62D 61/08; B60K 17/04
[52] U.S. Cl. ..................................... 180/215; 180/241
[58] Field of Search ....................... 180/215, 217, 73.4, 180/219, 209, 210, 230, 291; 280/282; 74/370

[56] References Cited

U.S. PATENT DOCUMENTS

| 584,685 | 6/1897 | Harris | 74/370 |
|---|---|---|---|
| 3,175,637 | 3/1965 | Honda | 180/73.4 |
| 3,964,563 | 6/1976 | Allen | 180/217 |
| 4,265,330 | 5/1981 | Silk et al. | 180/230 |
| 4,344,500 | 8/1982 | Kurata et al. | 180/230 |
| 4,373,601 | 2/1983 | Onda et al. | 180/230 |
| 4,392,536 | 7/1983 | Iwai et al. | 280/282 |
| 4,453,616 | 6/1984 | Porter | 280/282 |
| 4,469,188 | 9/1984 | Mita | 180/215 |
| 4,540,061 | 9/1985 | Watanabe | 180/215 |

Primary Examiner—John J. Love
Assistant Examiner—Karin L. Ferriter
Attorney, Agent, or Firm—Anthony Asquith & Co.

[57] ABSTRACT

An all-terrain tricycle is disclosed, in which the power-transmission components, including the change speed gears, are all mounted in a single housing. The housing is mounted for up and down suspension pivoting in the vehicle frame. The rear axle runs in bearings in the housing. The arrangement is very robust, yet economical. The suspension-pivot-bearings include spaced co-axial rings welded into the metal tubes of the frame.

14 Claims, 5 Drawing Figures

VEHICLE DRIVE AND SUSPENSION SYSTEM

This invention is in the field of drive and suspension systems for the axles of vehicles.

The invention is not applicable to an idling or non-driven axle of a vehicle, but only to a driven axle. The invention is not applicable to axles with independent suspension, but only to a driven axle of the kind known as a solid axle. A solid axle has respective wheels at either end, and the wheels are constrained to remain parallel to each other and at right angles to the axle and also to remain co-axial with each other and with the axle, at all times. A solid axle may or may not include a differential gear.

DESCRIPTION OF THE PRIOR ART

U.S. Pat. No. 4,392,536 (IWAI, July 12, 1983) shows an all-terrain tricycle with a solid rear axle. The rear axle is supported with respect to the vehicle frame by means of a suspension link, which pivots on bearings in the frame about an axis which is parallel to the rear axle. There are two suspension pivot bearings which define the axis. All sideways forces on the rear axle, and all yaw-producing and roll-producing forces, are taken by these suspension pivot bearings. The bearings constrain the axle against all modes of movement other than pivoting.

Since the spread of the bearings is quite limited, naturally the bearings have to be adequately designed so that they can cope with the sideways forces; in particular, the bearings have to cope with the yawing effect of a violent blow to just one of the wheels.

So that both the suspension pivot bearings can contribute to resisting the yawing, it is important that the suspension link is stiff and rigid. If the link were to be flexible, then besides the axle not being located properly, all the side forces could be felt by just one of the bearings.

The invention is aimed at overcoming the problem in IWAI of providing a suspension link of adequate rigidity, yet without undue bulk and expense.

There have been several prior patents in which a suspension link has been constructed as a hollow box. Such a link is extremely rigid. The hollow box serves usually, to house the drive-transmission components, and to provide an oil-tight container for those components.

Apart from the conventional use on motorcycles of such a suspension link, its use has been shown on a two-wheeled axle in such patents as U.S. Pat. No. 3,175,637 (HONDA, Mar. 30, 1965); U.S. Pat. No. 3,964,563 (ALLEN, June 22, 1976); and others. However, in no case has the use of a rigid hollow box as a suspension link been shown with a solid axle.

DESCRIPTION OF THE INVENTION

The invention lies not only in substituting IWAI's flimsy link with a rigid hollow box or housing containing the drive transmission components. It lies also in placing the drive input shaft to the housing so that the shaft is co-axial with the suspension pivot bearings. This means that no allowance need be made in the transmission components for variations in length due to suspension movements. Furthermore, in the invention, the housing is oil-tight, and the drive shaft protrudes out of the housing, and is sealed to the housing. The axle too is sealed to the housing.

This arrangement provides an immensely rigid suspension link, so that the suspension pivot bearings, placed on either side of the housing, can together cope with all sideways-force-induced stresses. The bearings can be simple rubber bushes, as will be described. Yet the housing is not expensive, since it serves the further function of containing the lubricating oil for the transmission components, which has to be provided in any event. The housing is a compact, self-contained unit of neat appearnce. Another benefit in the invention is that the axis of the drive shaft is fixed in relation to the vehicle frame so that the engine can be mounted without dificulty.

A further benefit that arises from the invention is that the change speed and reverse gears can be housed in the same housing as the transmission.

Other features of the invention will become apparent from the description which follows of a preferred embodiment of the invention.

IN THE FIGURES

FIG. 5 is a cross-sectional view of a reversed gear arrangement.

Figure 1:
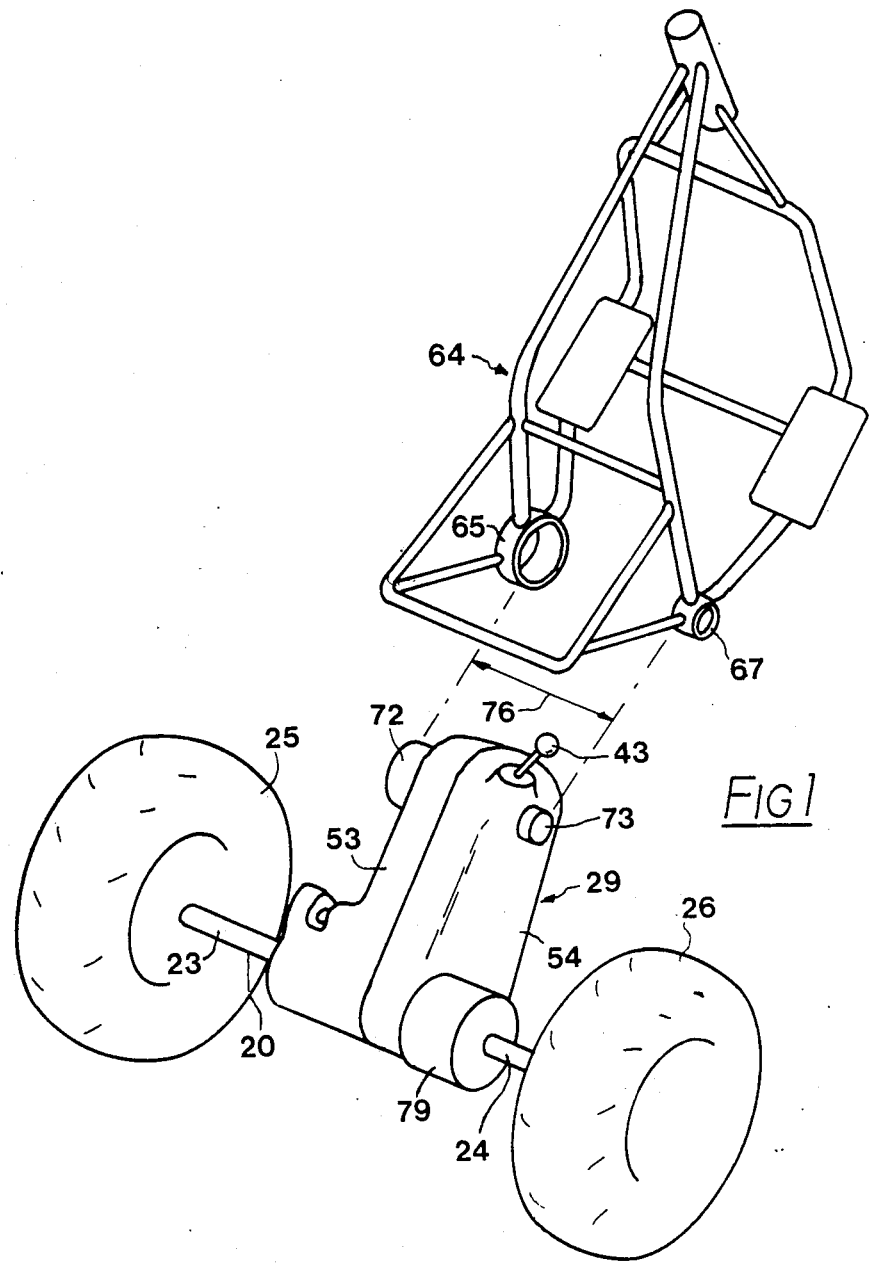
FIG. 1 is a pictorial view of a tricycle.
Figure 2:
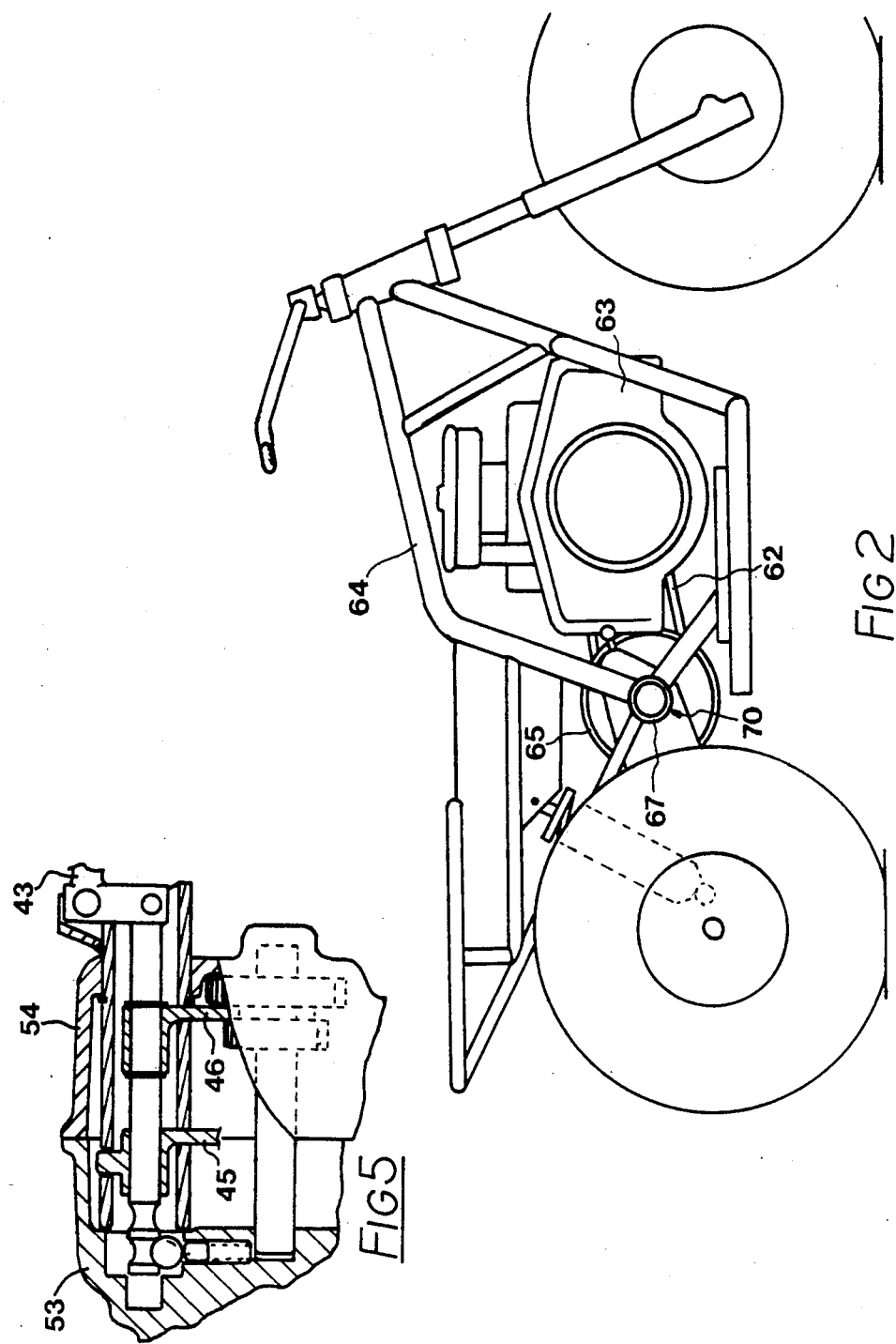
FIG. 2 is a side elevation of the tricycle of FIG. 1.
Figure 3:
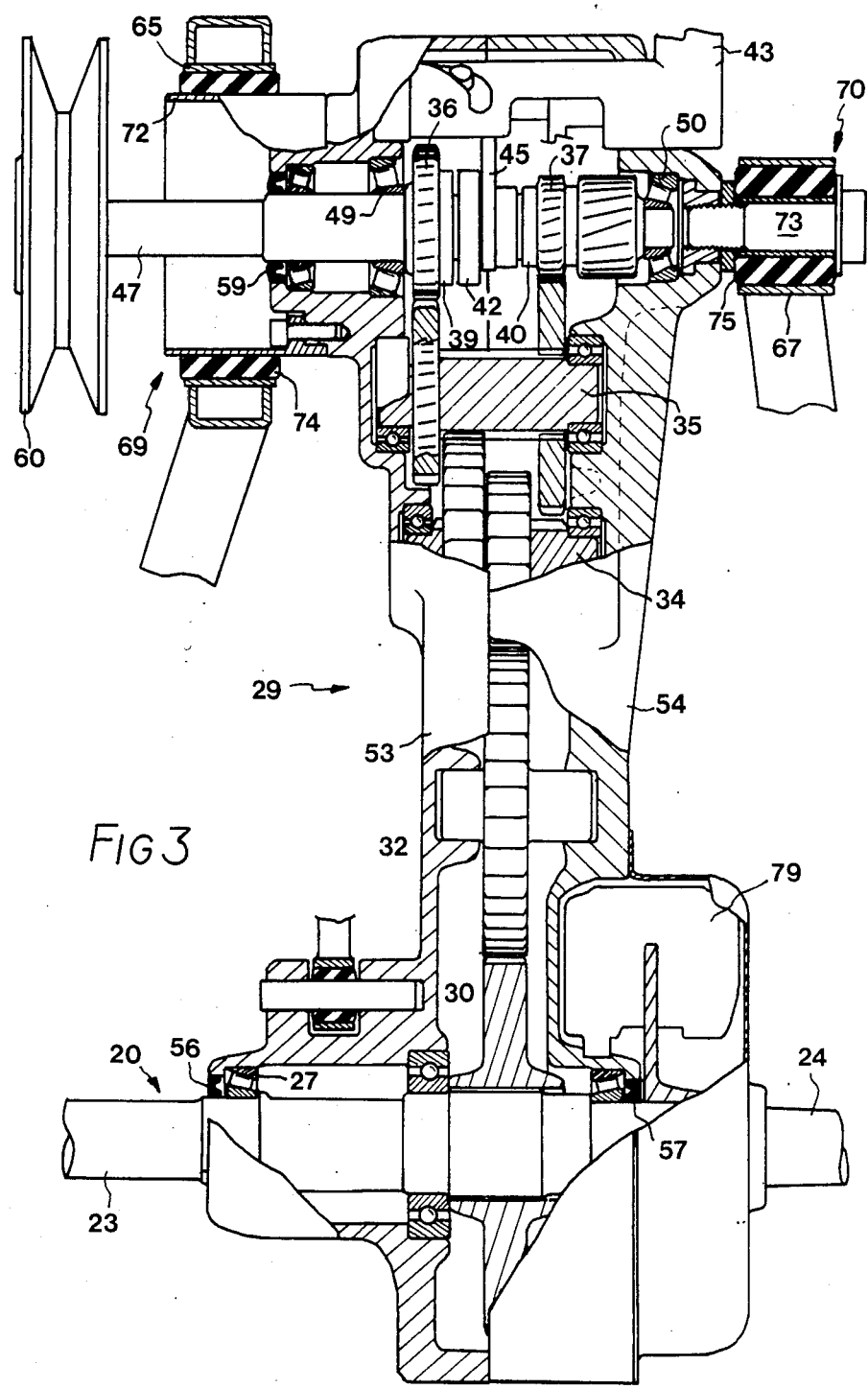
FIG. 3 is a cross-sectional view of a transmission housing of the tricycle of FIGS. 1 and 2.

In the tricycle shown in the drawings, the rear axle-shaft 20 comprises a left axle-shaft 23 and a right axle-shaft 24 formed as a one-piece, straight-through item, the vehicle having no differential gear. The left 25 and right 26 rear wheels both are fastened rigidly to the axle-shaft 20. Thus the two wheels 24, 26 are constrained to remain parallel to each other and at right angles to the axle-shaft 20, and to rotate in unison, at all times.

The axle-shaft 20 runs in bearings 27 in the housing 29. An axle-gear 30 is splined to the axle-shaft 20, so that it can only rotate in unison with the shaft 20. A transfer-gear 32 meshes with the axle-gear 30. The transfer-gear 32 meshes also with a step-down-gear 34 which meshes in turn with a lay-gear 35. The lay-gear 35 receives drive either from the large drive-gear 36 or from the small drive-gear 37, depending on which of the two dog-clutches 39, 40 is engaged by the selector-ring 42. The selector-ring 42 can also be set to a neutral position, where neither dog-clutch 39, 40 is engaged.

The selector-ring 42 is moved by means of the handle 43, which operates the change-speed-fork 45 and the reverse-gear-fork-46. The tricycle rider can operate the handle 43 simply by reaching downwards. The gear change arrangement is such that the handle 43 can be operated straight from neutral to any of the selectable gear ratios; there is no need to step through the ratios in sequence as has been the case with many tricycle (and bicycle) transmissions. The selectable ratios are: low speed; high speed; reverse; and neutral.

The two drive-gears 36, 37 are mounted on an input drive-shaft 47. The drive-shaft 47 runs in bearings 49, 50.

Figure 4:
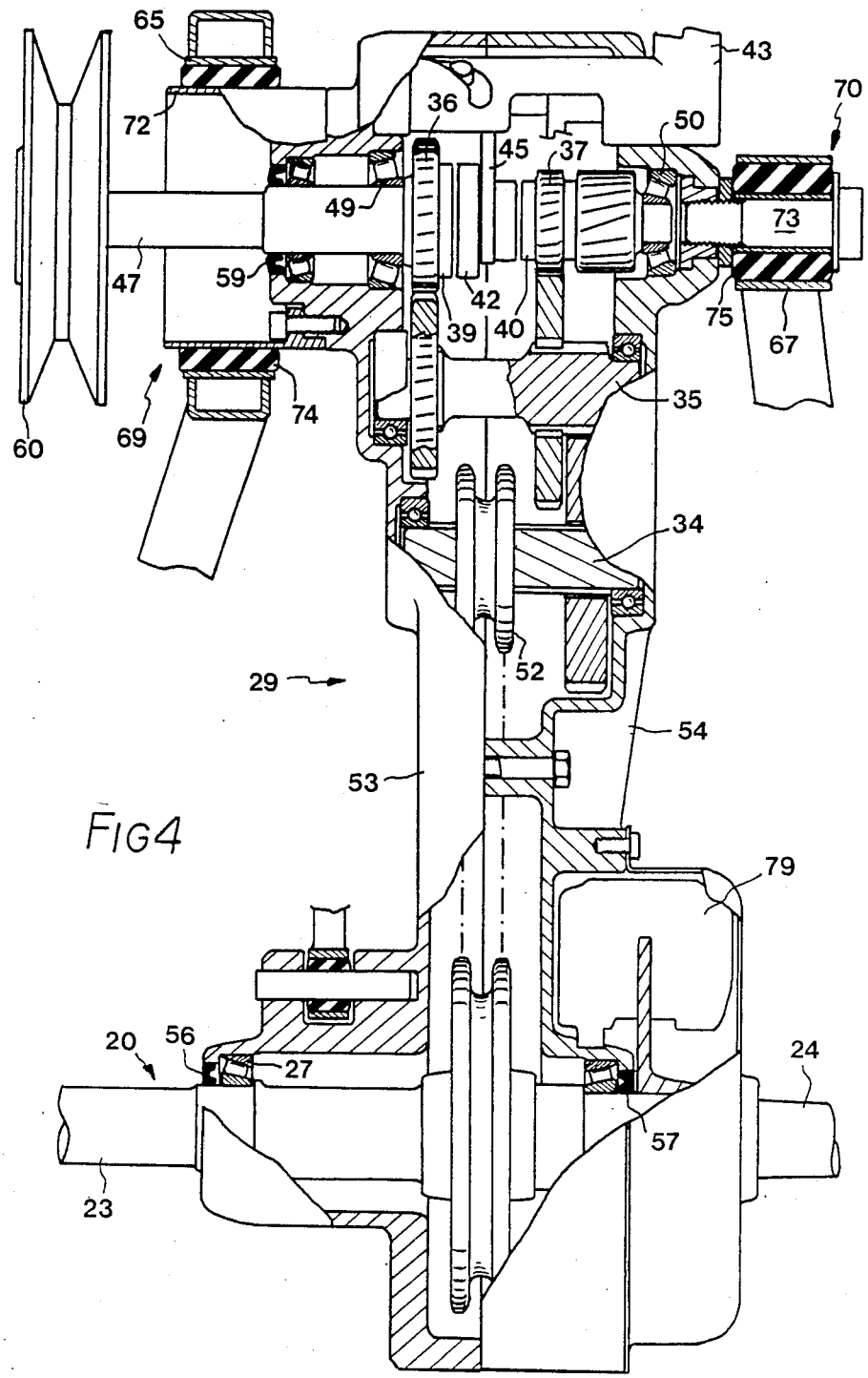
FIG. 4 is a cross-sectional view corresponding to FIG. 3 of a different transmission housing.

The arrangement shown in FIG. 4 is basically the same except that the connection between the step-down-gear 34 and the axle-shaft 20 is now by means of a chain drive 52.

The transmission-housing 29 is in two components 53, 54 which are bolted together. The container thus formed is oil-tight, the seals 56, 57 being effective to seal the axle-shaft 20 and the seal 59 being effective to seal the input drive-shaft 47. The handle 43 is also sealed to the housing 29.

Not only is the transmission housing 29 oil-tight, it is also water-proof, so that the vehicle can be driven into a depth of water without damage to the transmission components.

The input-shaft 47 receives its power from a pulley 60. The pulley 60 in turn receives its power via a drive-belt 62 from the engine 63. A centrifugal clutch is included in line with the engine 63 and the belt-drive arrangement to the pulley 60 includes a means (not here described) for changing the effective pulley diameter as a function of the speed of the engine.

The frame 64 of the vehicle is made up generally, of steel tubes welded together as shown. Welded into the arrangement of tubes are two rings, a large ring 65 on the left and a small ring 67 on the right. The rings 65, 67 are co-axial.

The rings 65, 67 form the basis of the suspension-pivot-bearings 69, 70 of the vehicle. The housing 29 is provided with a left hub 72 and a right hub 73. The left hub 72 comprises a hollow cylinder, whereas the right hub 73 is simply a threaded pin. Rubber bushes 74, 75 are interposed respectively between the rings 65, 67 and the respective hubs 72, 73.

The left bearing 69 is larger than the right bearing 70 to allow the input-drive-shaft 47 to be located concentrically with the left bearing 69.

Mounted on the housing is a rear-axle disc-brake 79, which is from the inside of the housing.

The housing 29 also includes a receptacle for receiving one end of a spring/damper unit. The other end of the spring/damper unit is connected to the frame 64 just under the seat. The spring-damper unit is arranged solely to take forces parallel to the longitudinal axis of the tricycle; the unit will not itself resist sideways forces on the axle.

All the sideways suspension forces on the rear axle-shaft 20 are fed into the frame 64 through the bearings 69, 70. The spread 76 of the bearings 69, 70 accordingly should be as wide as possible; it is recognized in the invention that the relatively small bearing-spread 76 that is achieved by arranging the components as shown is nonetheless adequate providing the housing itself is very rigid.

It is to be noted that this manner of construction of the tricycle drive and suspension system is very economical. Yet the drive described is quite sophisticated, and the suspension is more than adequate to handle the sometimes violently abusive loads experienced by an all-terrain tricycle.

The container inside the transmission-housing 29 contains lubricating oil, which serves not only to protect the drive transmission components, but also the change-speed-gear components. Thus the housing 29 doubles not only as a transmission-housing but also as a gearbox. Not only is the number of components kept to a minimum but also the components of the complete transmission-train themselves are self-contained to a large degree; they can be separately assembled and tested on the bench and the complete housing then simply mounted into the frame with little need for skilled installation and setting up. This "building block" facility makes for easy quality-control on the production line.

In its broadest aspect however, the invention is not limited to the feature of the change-speed-gears being included in the pivoting housing 29. There could, for example, be a separate gear-box mounted on the frame 64, so that the transmission-train within the housing then would not include the change-speed components.

I claim:

1. A vehicle which has at least one front wheel and left and right rear wheels, and which has a drive and suspension system that comprises:

a rear axle-shaft (20) which comprises a left axle-shaft (23) and a right axle-shaft (24);

where the left rear-wheel is fixed to the left axle-shaft in such a manner that the left rear-wheel cannot undergo any mode of movement relative to the left axle-shaft, and the right rear-wheel is similarly fixed to the right axle-shaft;

a transmission housing;

where the rear axle-shaft is mounted in axle bearings (27) in the transmission-housing;

where the arrangement of the left and right axle-shafts, the transmission-housing, and the axle-bearings is such that the axle shafts are constrained against all modes of movement with respect to the transmission-housing (29) other than rotation of the left (23) and right (24) axle-shafts;

and where the said arrangement is such that the axis of the axle-bearings (27), the axis of the rear axle-shaft (20), the axis of the left axle-shaft, and the axis of the right axle-shaft, are at all times co-linear;

where the transmission-housing (29) is located towards the center of the rear axle-shaft, substantially midway between the two rear-wheels (25, 26);

a vehicle frame;

where the transmission-housing is mounted with respect to the vehicle frame in left and right, spaced, suspension-pivot bearings (69, 70);

where the arrangement of the transmission-housing, the vehicle frame, and the suspension-pivot-bearings is such that the transmission-housing (29) is constrained against all modes of movement with respect to the vehicle frame (64) other than pivoting of the transmission-housing about the axis of the suspension-pivot-bearings (69, 70);

where the axis of the suspension-pivot-bearings is fixed in the frame (64);

where the axis of the suspension-pivot-bearings is parallel to the axis of the rear-axle (20);

where the transmission-housing (29) is rigid to such an extent that the axis of the axle-bearings (27) and the axis of the suspension-pivot-bearings (69, 70) remain parallel to each other and a fixed distance apart at all times;

a drive-shaft (47), through which power is transmitted from an engine (63) of the vehicle;

where the drive-shaft (47) is co-axial with the axis of an suspension-pivot-bearings (69, 70);

a power transmission-train (36,39,35,34,32,30; 36,39,35,34,52), which comprises means for transmitting power from the drive-shaft (47) to the rear axle (20);

where the transmission-housing (29) comprises an oil-tight container, which contains lubricating oil;

where the transmission train is contained wholly within the oil-tight container;

a drive-shaft-seal;

where the drive-shaft passes through a hole in the oil-tight container and the hole is sealed by the drive-shaft-seal;

left and right-axle seals;

where the left and right axle-shafts (23, 24) pass through respective holes in the oil-tight container, and the holes are sealed by the respective axle-seals where the transmission housing has the general shape and form overall, between the axis of the suspension pivot bearings and the axis of the axle bearings, of a single, unitary, rigid, hollow, closed tube.

2. Vehicle of claim 1 where a suspension-pivot-bearing (69, 70) includes a hollow cylindrical ring (65, 67) built into the vehicle frame (64).

3. Vehicle of claim 2 where a suspension-pivot-bearing (69, 70) includes a cylindrical hub (72, 73) fixed to the housing (29).

4. Vehicle of claim 3 where a suspension-pivot-bearing (69, 70) includes an elastomeric bush (74, 75) interposed between the ring and the hub.

5. Vehicle of claim 1 where a suspension-pivot-bearing (69) includes a cylindrical hub (72) fixed to the housing (29), and where that hub (72) is hollow and the drive shaft (47) is positioned concentrically inside the hollow hub.

6. Vehicle of claim 1 where a suspension-pivot-bearing includes:
a hollow cylindrical ring (65) built into the vehicle frame (64);
a cylindrical hub (72) fixed to the housing;
an elastomeric bush (74) interposed between the ring (65) and the hub (72);
a further suspension-pivot-bearing (70) having such a hollow cylindrical ring (67), such a cylindrical hub (73), and such an elastomeric bush (75), arranged co-axially with the said suspension-pivot-bearing (69);
and where the hub (72) of one (69) of the suspension-pivot-bearings is hollow and the drive-shaft (47) is positioned concentrically inside the hollow hub.

7. Vehicle of claim 1 where the transmission-train includes a chain-drive (52).

8. Vehicle of claim 1 where the transmission-train includes an axle-gear (30) directly in mesh with a transfer-gear (32).

9. Vehicle of claim 1 where the power transmission train includes means (35,35,37,39,40,42,45,46) for changing the speed ratio between the input shaft (47) and the rear axle-shaft (20).

10. Vehicle of claim 9 where the means for changing the speed ratio is operated by a handle (43) which protrudes from the transmission-housing (29), the handle being so located that the handle can be directly operated by the hand of a person driving the vehicle.

11. Vehicle of claim 10, where the handle (43) is operable from neutral directly to any selected one of the selectable gear ratios.

12. Vehicle of claim 1, where the axle-shaft (20) is of unitary construction, in which the left axle-shaft (23) and the right axle-shaft (24) are combined rigidly together in one piece.

13. Vehicle of claim 1 where the housing (29) is in two components (53, 54) which are joined together on a line that is substantially parallel to the longitudinal axis of the vehicle.

14. Vehicle of claim 1 where the vehicle is an all-terrain tricycle.

* * * * *